(12) United States Patent
Nair et al.

(10) Patent No.: US 12,019,052 B2
(45) Date of Patent: Jun. 25, 2024

(54) MONITORING MACHINE OPERATION FOR VARIOUS SPEED AND LOADING CONDITIONS

(71) Applicant: Rockwell Automation Technologies, Inc., Mayfield Heights, OH (US)

(72) Inventors: Suresh R. Nair, Amherst, MA (US); Lee A. Lane, Medford, MA (US); Brian J. Taylor, Boston, MA (US); Yongyao Cai, Maldan, MA (US); Burt Sacherski, Nashua, NH (US); Ashley M. Killian, Eastlake, OH (US); Kevin Zomchek, Nashua, NH (US); Michelle L. Poublon, Nashua, NH (US); Linxi Gao, Reading, MA (US); Timothy P. Wolfe, Medford, MA (US); Rebecca R. Jaeger, Somerville, MA (US); Wayne R. Foster, Tyngsborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 699 days.

(21) Appl. No.: 17/142,104

(22) Filed: Jan. 5, 2021

(65) Prior Publication Data

US 2022/0214316 A1 Jul. 7, 2022

(51) Int. Cl.
*G01N 29/44* (2006.01)
*G01M 13/00* (2019.01)
(Continued)

(52) U.S. Cl.
CPC ........ *G01N 29/4454* (2013.01); *G01M 13/00* (2013.01); *G01N 29/14* (2013.01);
(Continued)

(58) Field of Classification Search
CPC .... G01N 29/4454; G01N 29/14; G01N 29/46; G01M 13/00; G01M 13/028;
(Continued)

(56) References Cited

U.S. PATENT DOCUMENTS

| 5,922,963 | A | 7/1999 | Piety et al. |
| 2004/0153268 | A1 | 8/2004 | Volkel |

(Continued)

FOREIGN PATENT DOCUMENTS

EP 4 083 734 A1 11/2022

OTHER PUBLICATIONS

EPO, European Application No. 21215520.4, Extended European Search Report, dated May 17, 2022, pp. 1-11.

(Continued)

*Primary Examiner* — Charles R Kasenge
(74) *Attorney, Agent, or Firm* — Foley & Lardner LLP

(57) ABSTRACT

A method for monitoring machine operation for various machine speed and loads includes measuring vibration information at a sensor associated with a machine and an associated machine speed. The machine is a rotating machine. The method includes performing an operational frequency analysis of the vibration information and comparing results from the operational frequency analysis with a vibration signature for the machine. The vibration signature is for a machine speed that matches the machine speed of the measured vibration information. The vibration signature is one of several vibration signatures for the machine where each is for a different machine speed. The method includes identifying a potential failure mode based on a frequency range where the frequency analysis of the measured vibration information exceeds, by a threshold amount, the vibration signature of the plurality of vibration signatures that (Continued)

matches the machine speed, and transmitting an alert comprising the identified potential failure mode.

19 Claims, 8 Drawing Sheets

(51) Int. Cl.
    *G01N 29/14*     (2006.01)
    *G01N 29/46*     (2006.01)
    *G05B 19/05*     (2006.01)

(52) U.S. Cl.
    CPC ........... *G01N 29/46* (2013.01); *G05B 19/058* (2013.01); *G05B 2219/14006* (2013.01)

(58) Field of Classification Search
    CPC ............... G01M 13/045; G05B 19/058; G05B 2219/14006; G01H 3/08; G01H 1/003
    See application file for complete search history.

(56) References Cited

U.S. PATENT DOCUMENTS

| | | | |
|---|---|---|---|
| 2009/0292505 A1* | 11/2009 | Van Dyke | G01M 13/028 |
| | | | 702/184 |
| 2010/0082158 A1 | 4/2010 | Lakomiak et al. | |
| 2013/0013138 A1* | 1/2013 | Lu | B60L 3/0061 |
| | | | 702/34 |
| 2019/0203729 A1 | 7/2019 | Nishimura | |
| 2022/0153324 A1* | 5/2022 | Tarawneh | B61K 9/04 |

OTHER PUBLICATIONS

Office Action for EP Application No. 21215520.4 dated Jan. 16, 2024, pp. 1-9.

\* cited by examiner

MONITORING MACHINE OPERATION FOR VARIOUS SPEED AND LOADING CONDITIONS

BACKGROUND INFORMATION

The subject matter disclosed herein relates to monitoring machines using various sensors to predict failures and more particularly to monitoring machines and surrounding equipment at various machine speeds and machine loading conditions with various sensors to predict failures.

BRIEF DESCRIPTION

A method for monitoring machine operation for various machine speed and loading conditions is disclosed. A computer program product also perform the functions of the method. The method includes measuring vibration information at a sensor associated with a machine and an associated machine speed. The machine is a rotating machine. The method includes performing an operational frequency analysis of the vibration information and comparing results from the operational frequency analysis with a vibration signature for the machine. The vibration signature is for a machine speed that matches the machine speed of the measured vibration information. The vibration signature is one of a plurality of vibration signatures for the machine where each is for a different machine speed. The method includes identifying a potential failure mode based on a frequency range where the frequency analysis of the measured vibration information exceeds, by a threshold amount, the vibration signature of the plurality of vibration signatures that matches the machine speed, and transmitting an alert comprising the identified potential failure mode.

A method for failure prediction/detection includes measuring vibration information at a plurality of sensors associated with equipment associated with a machine. The machine is a rotating machine. The method includes, for each of the plurality of sensors, performing an operational frequency analysis of the vibration information. The method includes comparing results from each operational frequency analysis for a sensor with corresponding vibration signature for the sensor. The method includes identifying a potential failure mode in response to one or more operational frequency analyses of the plurality of sensors exceeding, by a threshold amount, the corresponding vibration signatures, and transmitting an alert that includes the identified potential failure mode.

A component for failure prediction/identification includes a processor and a memory that stores program code executable by the processor to measure vibration information at a sensor associated with a machine and an associated machine speed, where the machine is a rotating machine, perform an operational frequency analysis of the vibration information, and compare results from the operational frequency analysis with a vibration signature for the machine. The vibration signature is for a machine speed that matches the machine speed of the measured vibration information. The vibration signature is one of a plurality of vibration signatures for the machine, where each is for a different machine speed. The program code is executable by the processor to identify a potential failure mode based on a frequency range where the frequency analysis of the measured vibration information exceeds, by a threshold amount, the vibration signature of the plurality of vibration signatures that matches the machine speed, and to transmit an alert comprising the identified potential failure mode.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
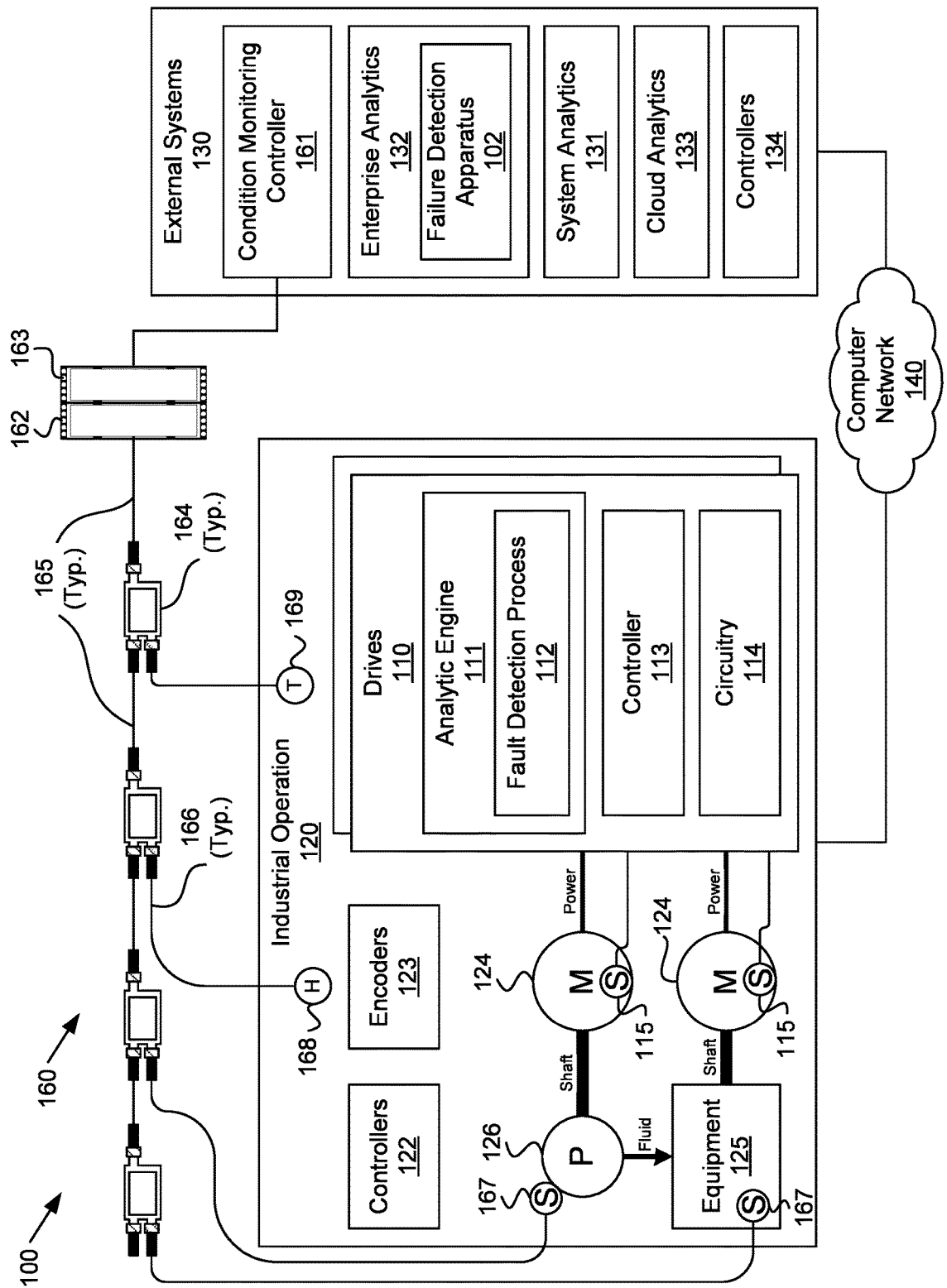
FIG. 1 is a schematic block diagram illustrating an industrial automation environment including an embodiment of a failure detection apparatus according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory ("RAM"), a read-only memory ("ROM"), an erasable programmable read-only memory ("EPROM" or Flash memory), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device. As used herein, a computer readable storage medium is non-transitory.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency ("RF"), or the like, or any suitable combination of the foregoing In one embodiment, the computer readable medium may comprise a combination of one or more computer readable storage media and one or more computer readable signal media. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

The description of elements in each figure may refer to elements of proceeding figures. Like numbers refer to like elements in all figures, including alternate embodiments of like elements.

A method for monitoring machine operation for various machine speed and loading conditions is disclosed. A computer program product also perform the functions of the method. The method includes measuring vibration information at a sensor associated with a machine and an associated machine speed. The machine is a rotating machine. The method includes performing an operational frequency analysis of the vibration information and comparing results from the operational frequency analysis with a vibration signature for the machine. The vibration signature is for a machine speed that matches the machine speed of the measured vibration information. The vibration signature is one of a plurality of vibration signatures for the machine where each is for a different machine speed. The method includes identifying a potential failure mode based on a frequency range where the frequency analysis of the measured vibration information exceeds, by a threshold amount, the vibration signature of the plurality of vibration signatures that matches the machine speed, and transmitting an alert comprising the identified potential failure mode.

In some embodiments, the plurality of vibration signatures are derived by measuring vibration information at the sensor for a plurality of machine speeds and performing, for each of the plurality of machine speeds, a frequency analysis of the vibration information to identify a vibration signature for each of the machine speeds. In further embodiments, the method includes controlling the machine to each of the plurality of machine speeds prior to measuring the vibration information. In other embodiments, the method includes controlling loading of the machine, where measuring the vibration information is for a plurality of machines speeds and loading conditions and each vibration signature is associated with a machine speed and a loading condition. In other embodiments, each vibration signature for the plurality of machine speeds is determined during a normal machine operation mode when the vibration signatures are at expected normal vibration levels.

In some embodiments, the method includes recording a loading condition for the machine along with the machine speed when measuring the vibration information. Each of the plurality of vibration signatures is associated with a machine speed and a loading condition and comparing results from the operational frequency analysis with a vibration signature includes comparing the results from the operational frequency analysis with a vibration signature that matches the machine speed and the loading condition of the machine during measurement of the vibration information. In other embodiments, the method includes interpolating between vibration signatures close to the machine speed to derive an interpolated vibration signature for comparison with the results from the operational frequency analysis.

In some embodiments, the method include a plurality of sensors and measuring vibration information, performing an operational frequency analysis, and comparing the results from the operational frequency analysis with a vibration signature are performed for each of the plurality of sensors and identifying a potential failure mode includes identifying a potential failure mode based on a frequency range where the frequency analysis of the measured vibration information exceeds the vibration signature of the plurality of vibration signatures for each of the plurality of sensors. In a further embodiment, the plurality of sensors are installed on a plurality of pieces of equipment and/or machines.

In some embodiments, the sensor is a vibration sensor or an acoustic sensor. In other embodiments, identifying a potential failure mode includes predicting a failure, identifying an initial stage of a failure, or identifying a failure that has occurred. In other embodiments, the method includes, in response to the alert, alerting a person of the identified potential failure mode, halting operation of the machine and/or equipment associated with the machine, and/or changing the machine speed of the machine to machine speed conducive to extending an operational life of equipment associated with the identified potential failure mode.

A method for failure prediction/detection includes measuring vibration information at a plurality of sensors associated with equipment associated with a machine. The machine is a rotating machine. The method includes, for each of the plurality of sensors, performing an operational frequency analysis of the vibration information. The method includes comparing results from each operational frequency analysis for a sensor with corresponding vibration signature for the sensor. The method includes identifying a potential failure mode in response to one or more operational frequency analyses of the plurality of sensors exceeding, by a threshold amount, the corresponding vibration signatures, and transmitting an alert comprising the identified potential failure mode.

In some embodiments, identifying a potential failure mode in response to one or more operational frequency analyses of the plurality of sensors exceeding the corresponding vibration signatures includes a plurality operational frequency analyses for a plurality of sensors each exceeding the corresponding vibration signature and identifying the potential failure mode from how much each of the plurality of operational frequency analyses exceeded the corresponding vibration signatures. In other embodiments, one or more sensors of the plurality of sensors are associated with a machine and the method includes measuring a machine speed associated with a sensor of the plurality of sensors when measuring vibration information for the sensor of the plurality of sensors. For each sensor associated with a machine of the plurality of sensors, the method includes comparing results from the operational frequency analysis for a sensor with corresponding vibration signature for the sensor. The corresponding vibration signature is for a machine speed that matches the machine speed of the machine associated with the sensor measured when measuring the vibration information for the sensor. In other embodiments, for each sensor associated with a machine, the method includes measuring vibration information at the sensor for a plurality of machine speeds and performing, for each of the plurality of machine speeds, a frequency analysis of the vibration information to identify a vibration signature for each of the machine speeds.

A component for failure prediction/identification includes a processor and a memory that stores program code executable by the processor to measure vibration information at a sensor associated with a machine and an associated machine speed, where the machine is a rotating machine, perform an operational frequency analysis of the vibration information, and compare results from the operational frequency analysis with a vibration signature for the machine. The vibration signature is for a machine speed that matches the machine speed of the measured vibration information. The vibration signature is one of a plurality of vibration signatures for the machine, where each is for a different machine speed. The program code is executable by the processor to identify a potential failure mode based on a frequency range where the frequency analysis of the measured vibration information exceeds, by a threshold amount, the vibration signature of the plurality of vibration signatures that matches the machine speed, and to transmit an alert with the identified potential failure mode.

In some embodiments, the plurality of vibration signatures are derived by program code executable by the processor to measure vibration information at the sensor for a plurality of machine speeds and to perform, for each of the plurality of machine speeds, a frequency analysis of the vibration information to identify a vibration signature for each of the machine speeds. In other embodiments, the program code is further executable by the processor to control the machine to each of the plurality of machine speeds prior to measuring the vibration information, and each vibration signature for the plurality of machine speeds is determined during a normal machine operation mode when the vibration signatures are below expected normal vibration levels. In other embodiments, the program code is further executable by the processor to record a loading condition for the machine along with the machine speed when measuring the vibration information. Each of the plurality of vibration signatures is associated with a machine speed and a loading condition and comparing results from the operational frequency analysis with a vibration signature includes comparing the results from the operational frequency analysis with a vibration signature that matches the machine speed and the loading condition of the machine during measurement of the vibration information.

Various embodiments of the present technology generally relate to condition monitoring in industrial environments. More specifically some embodiments relate to an embedded analytic engine for machine drives. While the analytic engine and failure detection apparatus of the present disclosure is discussed in reference to rotating machinery and machine drives, the technology may be applied to any industrial device to monitor signals other than those discussed herein. In rotating machinery, condition monitoring may refer to monitoring the health of a drive machine, the health of a mechanical load, or both. Condition monitoring plays an important role in industrial systems, as it enables predicting machine and load failures in rotating machinery. High-speed drive signals are sent to a programmable logic controller ("PLC") at much lower data rates than they are captured and, as a result, there is loss of information without a simple means to transfer the high-speed data. Thus, embodiments herein include a general-purpose embedded drive analytic engine on top of which applications for detecting specific fault conditions may be built.

Existing technology does not provide a simple mechanism by which industrial enterprises, facilities, devices, or similar may monitor the health of rotating machinery without requiring multiple hardware components, sensors, and cabling in addition to complex configurations of several parameters across a plurality of software packages. These factors cause set up of such a system to be expensive and time-consuming. Other disadvantages of existing solutions include that they are only suitable for single-drive applications and not suitable for PLC system-level analytics. Furthermore, they do not work in stand-alone applications that do not have communication to external systems. In the industry, there is an overall lack of integrated solutions and configurability, contributing to a need for a simpler, streamlined solution that enables condition monitoring for rotating machinery without excessive costs.

Rotating machinery is available in various forms, such as motors, gas turbines, wind turbines, generators, pumps, fans, blowers, and the like. Rotating machinery often runs at different speeds where speed control is provided by various devices, such as drives and PLCs. A drive, in some embodiments, provides specific speed control and analytics for rotating machinery. In other embodiments, a PLC provides speed control and/or analytics and may also provide a wider range of control over rotating machinery and other equipment of an industrial operation.

An important instruments associated with machine control include a type of drive called a variable frequency drive ("VFD") when the machine is a motor. VFDs may be used to supply power to motor driven loads, allowing them to operate within a wide range of speeds (i.e., an infinite number of speeds within the operating range). VFDs may control position, speed, torque, acceleration, direction of rotation, and similar variables associated with a rotating machine. The use of VFDs can greatly increase efficiency in a variety of industrial systems such as pump, compressor, conveyor, crane, and fan systems. For an application with multiple drives and/or multiple VFDs, a PLC, in some embodiments, is a program-based computer used in motor control systems, typically to synchronize the motion across multiple drives.

Thus, a general-purpose, configurable analytic engine embedded in a machine drive (i.e., a VFD or other drive) is disclosed along with a failure detection apparatus. An analytic engine in accordance with the present disclosure may include an application layer that hides configuration complexity and simplifies a user's experience. The analytic engine may be configured to monitor various applications and detect degradation of a machine or its detected mechanical load early on. In the process, the analytic engine extracts application specific information from data at the data source. Results in accordance with the present technology are information rich and data light. The results can be easily sent through a network to an associated PLC or may easily be sent through a gateway to an external computing environment (e.g., a cloud) without loss of information, network congestion, and without requiring high-speed data transfer, where the failure detection apparatus may use data from the analytics engine to predict faults and failures. Data heavy signals are converted to data light information for network transport and may be used for detection at all levels of an industrial environment as a result.

A drive-embedded analytic engine in conjunction and/or the failure detection apparatus, in accordance with the present disclosure, enable industrial enterprises, employers, and other users to monitor a machine, a connected load and other industrial equipment in order to detect failures before they occur. Predicting electrical, motor-mechanical, and load-mechanical fault conditions before they happen may serve to prevent unscheduled downtime and reduce spare parts inventory, for example. Various high-speed, data heavy drive signals may be configured, measured, and analyzed within the drive without requiring additional hardware and wiring and without loss of information. Analytic measurements and outputs of the engine are information rich and data light and, as a result, can be sent through a network to a PLC controller or through a gateway to a cloud environment for purposes of display, aggregation, and further analysis without bogging down the network. These advantages allow analytic algorithms in a PLC to predict faults that occur across systems with multiple drives and sensors.

Information from the analytic engine in addition to information from other sensors may be used by the failure detection apparatus to predict failures. In addition, vibration data, rotating machine data, motor data, current data, voltage data, etc. is collected for various machine speeds and/or loading conditions to establish a baseline or envelope, such as a vibration signature, so that subsequent sensor readings that exceed the envelope for a particular machine speed/load to more particularly isolate and identify and predict failures at an early state before actual failures stop equipment and incur costly shutdowns. The failure detection apparatus, in some embodiments, gathers information from rotating machines, motors, loads, associated equipment, etc. to locate and isolate failures.

As previously mentioned, condition monitoring as discussed herein may be used to detect failure conditions of rotating machinery. Condition monitoring may be performed within the drive (i.e., the VFD or other drive) via frequency analysis of vibration sensors, phase currents and other drive signals. In some embodiments, data is gathered from internal sensors from a condition monitoring system, such as a Dynamix™ 1444 Series condition monitoring system from Allen-Bradley®. Condition monitoring may also include a condition monitoring system, such as GuardLink® by Rockwell Automation®, which may be used alone or to supplement data from the drives. Known failures associated with rotating machines, motors and mechanical loads may be related to mechanical components of a machine, vibrations, electrical components, and similar aspects of rotating machinery for various machine speeds and loading conditions. Certain failures cannot be detected at the controller or cloud level because they may use high speed data and memory. Thus, the present technology enables some failure detection from within the drive using an analytic engine. The present technology may be used to detect failures of bearings, rotor bars, shafts, windings, oil whirl and whip, rolling elements, gears, teeth, comparators, connectors, or similar componentry associated with rotating machinery while other sensors may be used to detect failures in loads and other industrial equipment external to the machine and drive.

The present technology may detect problems including misalignment, unbalance, instability, resonance, wear, damage, degradation, buildup, cracking, bending, breaking, blade pass, vane pass, backlash, blockages, load, looseness, turbulence, rub, eccentricity, phase problems, phasing problems, current, tuning problems, or cavitation and blockage, in addition to other associated problems that may be present with rotating machinery at particular machine speeds and loading conditions. The present technology may be used for vibration monitoring, monitoring of induction motor faults, or monitoring of pumps, fans, blowers, compressors, conveyors, cranes, and hoists, in addition to other equipment employing a machine drive.

Condition monitoring, in accordance with the present technology, includes four foundational steps: input selection, data acquisition, feature extraction, and detection. Input selection includes selecting the input signal source, such as signals from vibration, temperature, or acoustic sensors or drive signals like phase current and voltage, torque reference, or velocity feedback that may be used in accordance with fault condition monitoring settings for a given scenario. Data acquisition includes capturing data from the selected signals that is related to the fault condition monitoring settings. Feature extraction includes converting the captured data content, including high speed data content, to information content (i.e., metrics), which may be fast information content in some implementations.

Converting data content to information content may include the utilization of frequency domain techniques such as Fast Fourier Transform ("FFT") algorithms, time domain techniques such as extracting average, minimum, maximum, and root mean square ("RMS") information, or other transform techniques to extract pattern recognition, correlation, or variance information. The fourth step, detection, is applied to the extracted information to enable the detection of fault conditions. Fault conditions may be detected using thresholds and technology for identifying when thresholds are exceeded. Thresholds may differ at various machine speeds and/or loading conditions so that the present technology, in some embodiments, establishes baseline envelope information (vibration signatures) at various machine speeds and/or loading conditions during a learning phase and/or during normal operation. Detection may additionally or alternatively include machine learning ("ML") techniques to predict and detect failures by categorizing conditions or by similar statistical means.

FIG. 1 is a schematic block diagram illustrating an industrial automation environment 100 including an embodiment of a failure detection apparatus 102 according to an embodiment. The industrial automation environment ("environment") 100 includes drives 110, an industrial operation 120, and external systems 130. The drives 110 include an analytic engine 111, a controller 113, and circuitry 114. The industrial operation 120 illustrated in FIG. 1 includes internal sensors 115, PLC automation controllers 122, encoders 123, machines 124, industrial equipment 125 and a pump 126. External systems 130 include system analytics 131, enterprise analytics 132, cloud analytics 133, and PLC automation controllers 134. The industrial operation 120 may represent any industrial machine or system with rotating machines 124, which may be powered by a drive 110. The components of the drive 110 and the industrial operation 120 may differ depending on a given implementation and machine type. Systems shown herein may include additional components, fewer components, and different components and may still be in accordance with the technology of the present example. Likewise, the internal sensors 115, the PLC automation controllers 122, and the encoders 123 may each represent any number of sensors, controllers, and encoders, respectively, associated with an industrial operation 120. The external systems 130 serve to represent or include any layer of an industrial automation environment external to drives 110, where external analytics may collect and analyze data from the analytic engine 111 and/or separately from the analytic engine 111 and perform system analytics.

In embodiments with a VFD and motor, the drive 110 may be a VFD which supplies power to a motors of the industrial operation 120 and receives signal data from the industrial operation 120. The analytic engine 111 runs a fault detection process 112 to detect faults within the industrial operation 120 based on the signal data. The analytic engine 111, in some embodiments, is a configurable analytics processor that provides flexibility for condition monitoring and includes an application layer that hides complexity and simplifies the user experience for individual applications and fault detection. The analytic engine 111 may be configured to monitor various applications and detect degradation or other faults of a motor and a connected mechanical load, such as the industrial equipment 125 or pump 126, from the industrial operation 120.

The industrial automation environment 100, in some embodiments, includes an external condition monitoring system 160 with a controller 161 where the external condition monitoring system 160 is external to equipment 122-126 and drives 110 of the industrial operation 120. The external condition monitoring system 160, in some embodiments, includes a safety relay 162, a network interface 163, connection taps 164, trunk line conductors 165, tap conductors 166, and external sensors such as vibration sensors 167, a humidity sensor 168 and a temperature sensor 169, which are described below.

In some embodiments, the external condition monitoring system 160 includes a network interface 163 connected to a safety relay 162. The network interface 163 provides a network connection to the condition monitoring controller 161. For example, the external condition monitoring system 160 may include one internet protocol ("IP") address and may be able to provide information from safety devices through the single IP address to the condition monitoring controller 161. Such an arrangement beneficially reduces the number of IP addresses for a plant with one or more industrial operations 120. Other networking interfaces 163 may include more than one IP address, for example, for multiple safety relays 162 or multiple lines from a safety relay 162. In addition to the external sensors, the external condition monitoring system 160 may include other safety devices, such as a non-contact switch, a light curtain, a locking switch, an emergency stop, a light curtain, an actuator, a cable pull switch, a key interlock switch, and the like. In other embodiments, one or more external sensors and/or safety devices include an IP address. In other embodiments, the external sensors and/or safety devices run on a proprietary network different than an IP network. In other embodiments, the external sensors connect directly to the condition monitoring controller 161.

The external sensors 167 are external in that the external sensors 167 are not integral with the machines 124 and/or drives 110. The term "external sensor" and "internal sensor" are used merely to connote that the external sensors 167 are connected to the external condition monitoring system 160 and the internal sensors 115 are connected to the drives 110 and "internal" versus "external" are not used herein to describe actual location of the sensors 115, 167 with respect to equipment. In some embodiments, information from the external sensors 167 complement information from the internal sensors 115 and may facilitate locating a potential failure. For example, vibration data from an external vibration sensor 167 in the pump 126 along with vibration data from an internal sensor 115 in a connected machine 124 may be used to determine if the source of the vibration is in the pump 126 or machine 124.

In some embodiments, the external condition monitoring system 160 includes one or more vibration sensors 167 located in various equipment (e.g. 125, 126) of the industrial operation 120. The vibration sensors 167, in some embodiments, are positioned to detect vibration in bearings, bearing races, belts, gears, and the like, to detect cavitation in the pump 126 or other potential sources of vibration. In other embodiments, the external condition monitoring system 160 includes acoustic sensors to detect sound caused by vibration or other problem noises. One of skill in the art will recognize other equipment and locations in the industrial operation 120 to monitor with a vibration sensor 167, acoustic sensors, etc.

In some embodiments, the sensors 115, 167 are accelerometers. The accelerometers are mounted to detect vibration of a particular part of a machine 124 or other equipment, and mountings of the sensors 115, 167 may be a magnetic mounting, an epoxied mounting or a stud mounting where the type of mounting may be selected based on a desired frequency range of the accelerometers. In some embodiments, the sensors 115, 167 are piezoelectric sensors, such as integrated circuit piezoelectric ("ICP") industrial accelerators. In some embodiments, the sensors 115, 167 are dual output sensors, which may measure two parameters such as vibration and temperature. In some embodiments, a sensor 115, 167 may be an eddy current probe for vibration measurement on machines 124 with fluid film bearings. In some embodiments, sensors 115, 167 are selected based on expected frequencies used for analysis. For example, some sensors 115, 167 may be selected to measure maximum frequencies ("FMAX") up to about 2 kilo hertz ("kHz") or 5 kHz. Other sensors 115, 167 may sense frequencies up to 40 kHz and beyond when measuring spike energy.

In some embodiments, the external condition monitoring system 160 includes one or more humidity sensors 168 to monitor humidity in or around the industrial operation 120. Humidity may increase corrosion, rust, etc. and may contribute to equipment failures. In other embodiments, the external condition monitoring system 160 includes one or more temperature sensors 169 to monitor temperature in or around the industrial operation 120. In other embodiment, one or more temperature sensors 169 are located inside equipment. Abnormal temperature may increase equipment failures. In other embodiments, the external condition monitoring system 160 includes other sensors, such as chemical sensors, to monitor conditions in the industrial operation 120. One of skill in the art will recognize other sensors useful by the failure detection apparatus 102 to predict failures.

Although the analytic engine 111 may be in communication with any analytics system of the external systems 130, for some types of faults/failures the analytics engine 111 does not require external systems 130 to perform condition monitoring in accordance with the technology disclosed herein. Information about certain faults or failures are fed to the failure detection apparatus 102 and combined with other sensor data to predict and/or detect faults and failures. As used herein, the terms faults and failures are used interchangeably. To perform condition monitoring within a drive 110, the analytic engine 111 may implement the fault detection process 112 independently from external systems 130. However, in some examples discussed herein, the external systems 130, and specifically the failure detection apparatus 102, may be in communication with analytic engine 111, components of the industrial operation 120, or combinations thereof and the failure detection apparatus 102 of the external systems 130 may perform condition monitoring independently of the analytic engine 111 or based on data from the analytic engine 111.

In some examples, an enterprise such as the failure detection apparatus 102 may use the analytic engine 111 as one component of a greater condition monitoring and analysis system within the enterprise. A modular topology may utilize the analytic engine 111 at the device level in addition to processes and analyses performed at the system and enterprise level, such as condition monitoring by the external condition monitoring system 160. At the device level, the analytic engine 111 may collect data from internal sensors 115 of devices of the industrial operation 120 and other sources in various formats.

The analytic engine 111 may use collected data to perform condition monitoring, power and energy monitoring, predictive life analysis, load characterization, or similar analyses. At the system level, system analytics 131 may aggregate and contextualize information to detect system level fault conditions and/or provide insights related to preventative maintenance, energy diagnostics, system modeling, performance optimization, and similar insights. At the enterprise level, enterprise analytics 132, cloud analytics 133, or a combination thereof may present information to users on devices and systems including mobile devices and desktop computers to enable remote learning, machine learning, and root cause analysis. Specifically, the failure detection apparatus 102 uses information from the analytic engine 111 and from the condition monitoring controller 161 to predict and detect failures. In FIG. 1 the failure detection apparatus 102 is depicted in the enterprise analytics 132, but may reside in the condition monitoring controller 161, a server, a cloud computing environment, the system analytics 131 or other convenient location. In other embodiments, the failure detection apparatus 102 is located in the analytic engine 111.

The computer network 140 may be wired, wireless or a combination of both. The computer network 140 may include a local area network ("LAN"), a wide area network ("WAN"), a fiber optic network, a proprietary network, the Internet, a wireless connection, and/or the like. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an infrared connection including connections conforming at least to the Infrared Physical Layer Specification ("IrPHY") as defined by the Infrared Data Association® (IrDA®). Alternatively, the wireless connection may include a cellular telephone network communication. All standards and/or connection types include the latest version and revision of the standard and/or connection type as of the filing date of this application.

Figure 2:
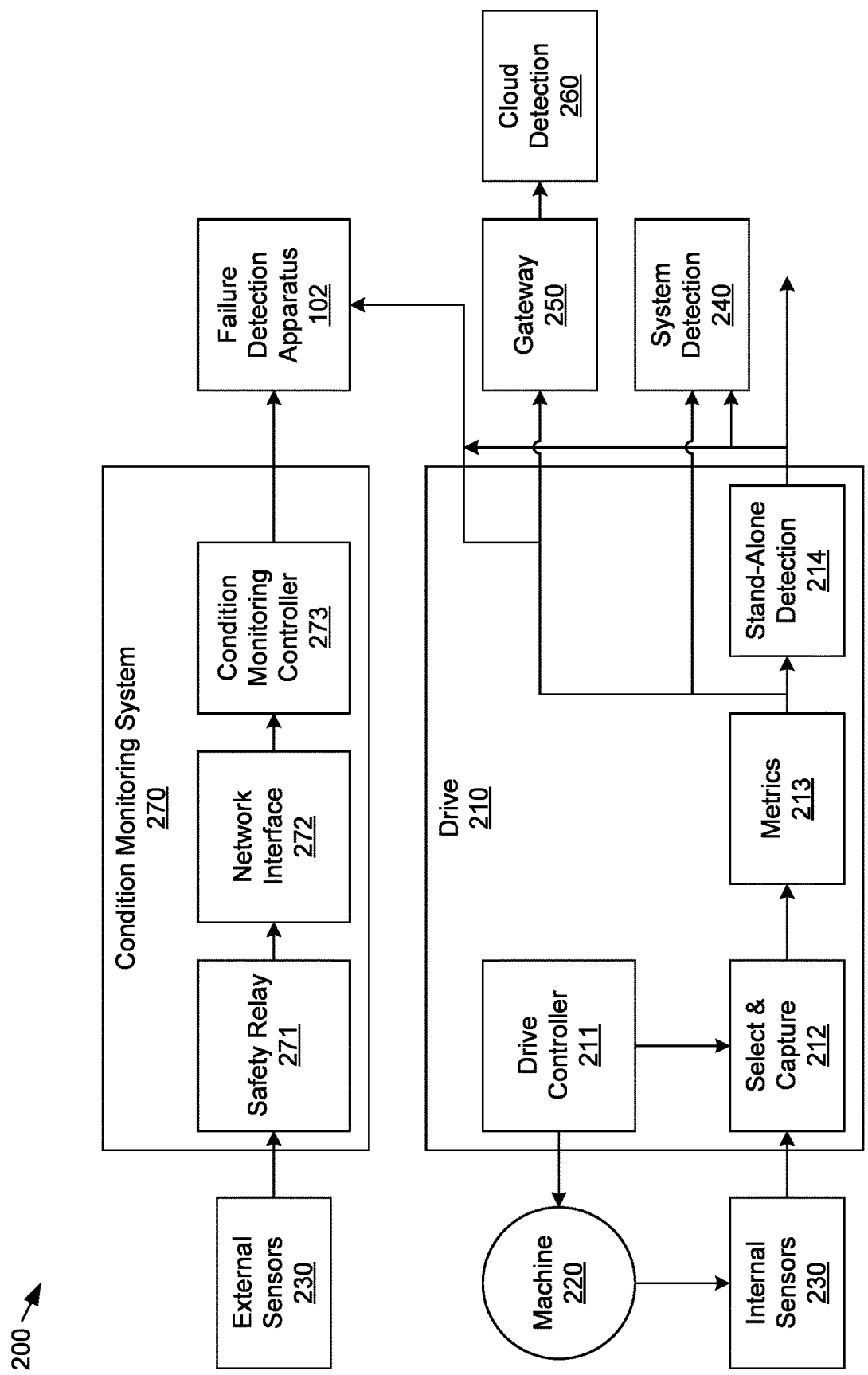
FIG. 2 is a schematic block diagram illustrating a process associated with an embodiment of a failure detection apparatus according to an embodiment.

FIG. 2 is a schematic block diagram illustrating a process 200 associated with an embodiment of a failure detection apparatus 102 according to an embodiment. The process 200 includes a drive 210, and in some embodiments, is representative of a variable frequency that includes an analytics engine 111 such as in the drive 110 of FIG. 1. Components of the drive 210 serve to represent functionality of a drive comprising an analytics engine 111 for device-level condition monitoring. A drive controller 211 provides an output supplied to a machine 220, which may be representative of any machine-driven industrial operation including the industrial operation 120 of FIG. 1. The internal sensors 230 may include vibration, temperature, acoustic, or other external sensors that collect data related to operation of the machine 220 and provide the data to a select and capture module 212.

The select and capture module 212, in some embodiments, collects data from a drive signal or an internal sensors 230, depending on what signal is selected, and provides the captured data to a metrics module 213. The select and capture module 212, in some embodiments, is used during baseline and runtime captures, such as at different machine speeds and loading conditions. The metrics module 213 processes the data to generate metrics data that can be utilized for fault detection and prediction by the failure detection apparatus 102. The data collected by the select and capture module 212 and processing performed by the metrics module 213 may, in some embodiments, depend on settings specific to one or more fault conditions being monitored. For example, for a given fault condition, settings may change which drive signal is selected to capture in the select and capture module 212 as well as the manner in which the metrics module 213 processes the data by changing signal paths to implement various filters and algorithms, performing measurements, utilizing specific parameters, or other settings that may affect processing to produce metrics specific to a fault condition. In some embodiments, metrics are calculated independently for baseline and runtime captures and then differences are calculated between them. Metrics may then be output by the metrics module 213 and provided to one or more systems and modules for condition monitoring, such as to the failure detection apparatus 102.

The output of the metrics module 213 is provided to the stand alone detection module 214 which may then use the metrics produced by the metrics module 213 to perform fault detection within the drive 210, such as comparing vibration information for a particular machine speed with a vibration signature for the machine speed to identify faults. Stand-alone detection, in some examples, includes determining if one or more fault conditions is present based on the settings specific to at least one fault being monitored. Detection methods include thresholding or machine learning. In addition to supplying the metrics to the stand alone detection module 214, metrics may be provided to additional systems for condition monitoring or other purposes. In the present example, metrics are provided to the failure detection apparatus 102 for predicting and detecting failures. In a further example, metrics are provided to a system detection module 240 for other system-level fault/failure detection. Metrics, in some embodiments, are also provided to gateway 250 and ultimately to cloud detection module 260 for enterprise-level fault detection. Metrics may also be provided to additional systems or locations. Similarly, stand-alone detection module 214 may provide detection results to one or more external locations including system detection module 240. In some embodiments, the stand-alone detection module 214 may provide results to a gateway 250, a cloud detection module 260, or any other system in communication with the stand-alone detection module 214.

One or more external sensors 230 in the depicted embodiment, such as the external sensors 167 of FIG. 1, provide information to a safety relay 271 of a condition monitoring system 270, such as the safety relay 162 and the external condition monitoring system 160 of FIG. 1. The safety relay 271 provides information to a network interface 272 for transmittal over a computer network to a condition monitoring controller 273, which transmits information to failure detection apparatus 102. In some embodiments, the network interface 272 is similar to the network interface 163 and the condition monitoring controller 273 is similar to the condition monitoring controller 161 of FIG. 1. The network interface 272, in some embodiments, is a network gateway with an IP address. In other embodiments, the external sensors 230 transmit data directly to the condition monitoring controller 273.

Figure 3:
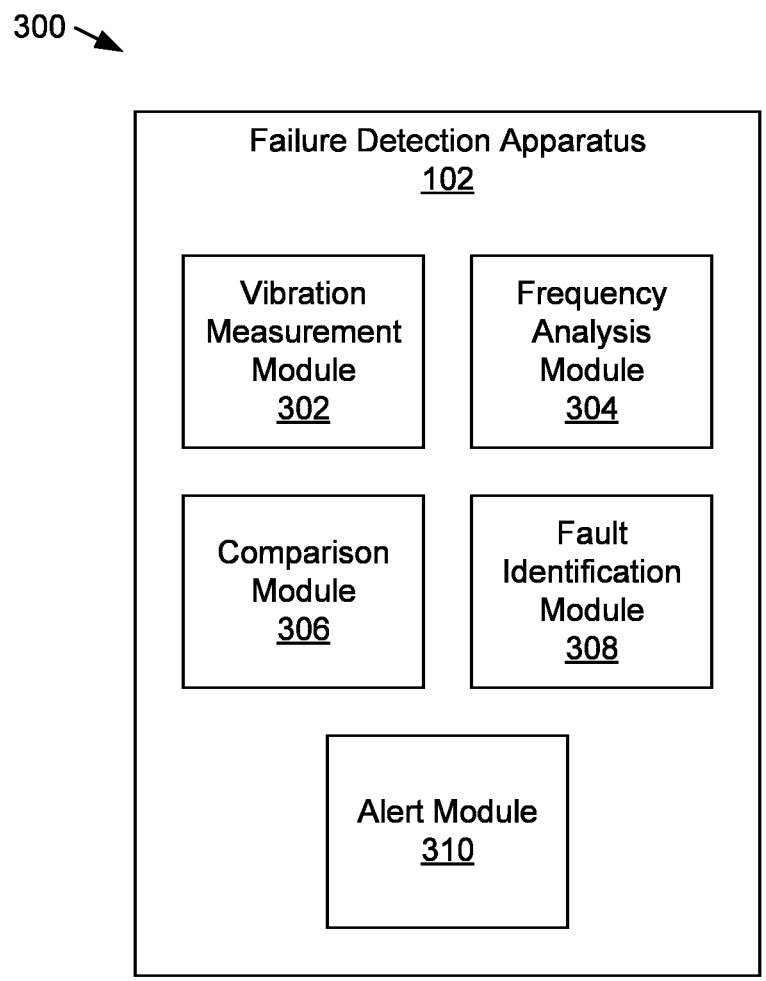
FIG. 3 is a schematic block diagram illustrating one embodiment of a failure detection apparatus according to an embodiment.

FIG. 3 is a schematic block diagram illustrating one embodiment 300 of a failure detection apparatus 102 according to an embodiment. The embodiment of the failure detection apparatus 102 includes a vibration measurement module 302, a frequency analysis module 304, a comparison module 306, a fault identification module 308 and an alert module 310, which are described below.

The failure detection apparatus 102 includes a vibration measurement module 302 configured to measure vibration information at a sensor (e.g. 115, 167) associated with a machine 124 and an associated machine speed. In some embodiments, the sensor is an internal sensor 115 connected to a drive 110 driving the machine 124 and is positioned to measure machine vibration. The internal sensor 115, in some embodiments, is a vibration sensor. In other embodiments, the internal sensor 115 is an acoustic sensor that senses vibration as a function of sound. In various embodiments, the internal sensor 115 is positioned to measure unbalance, bearing anomalies, gear problems, mounting looseness, a component loose on a shaft, wear clearance anomalies, a loose bearing assembly, oil whirl instability, oil whip instability, or other problem in the machine 124 that results in vibration different than baseline vibration. Where the internal sensor 115 is a vibration sensor, the vibration sensor may be an accelerometer-type vibration sensor, a pin and spring vibration sensor, a piezoelectric vibration sensor, a magnetic vibration sensor, or the like.

In other embodiments, the sensor is an external sensor 167 and is positioned to measure vibration on equipment other than the machine 124. In one example, the external sensor 167 is mounted to a pump 126 driven by the machine 124, which may be a motor. The external sensor 167 may be mounted to the pump 126, to a shaft housing, to a housing that includes the pump 126 and machine 124 or other location associated with the machine 124. In other embodiments, the external sensor 167 may be mounted to equipment 125 driven by a machine 124 and the external sensor 167 may be mounted to a gear box, to a belt, to a shaft housing, etc. In other embodiments, the external sensor 167 may be mounted to a housing, to a frame or other equipment associated with a machine 124. One of skill in the art will recognize other locations for an external sensor 167 where the sensor is associated with a machine 124 in some way.

The sensor 115, 167 being associated with the machine 124, in some embodiments includes sensing vibration for equipment driven by the machine 124. In other embodiments, the sensor 115, 167 is associated with the machine 124 by mechanical coupling so that vibration at the sensor 115, 167 could be caused by the machine 124 or by some other nearby equipment so that multiple sensors 115, 167 could be used to isolate vibration anomalies. In other embodiments, the sensor 115, 167 is associated with the machine 124 where machine vibration is sensed by the sensor 115, 167. One of skill in the art will recognize how the sensor 115, 167 is associated with the machine 124.

In addition to measuring vibration information, the vibration measurement module 302 also measures machine speed. The vibration measurement module 302 measures machine speed at the time the vibrations are measured and associates the machine speed with the measured vibration. In some embodiments, the vibration measurement module 302 accesses information from a tachometer (not shown) positioned to measure machine speed of the machine 124. In other embodiments, the vibration measurement module 302 measures machine speed by receiving information from the drive 110 regarding machine speed. For example, the drive 110 may access a tachometer or other sensor on the machine 124 to determine machine speed. In other embodiments, the vibration measurement module 302 uses a commanded machine speed of the machine 124 rather than measured machine speed. For example, the vibration measurement module 302 may wait to measure vibration information until after a transient period so that the machine 124 is likely to be at a commanded machine speed. One of skill in the art will recognize other ways for the vibration measurement module 302 to measure vibrations information at a particular machine speed.

The vibration measurement module 302, in some embodiments, measures vibration for a particular time period where the time period provides enough vibration data to analyze the measured vibration information. In one example, the vibration measurement module 302 measures vibration information for a time period sufficient for a frequency analysis on the vibration information. In some examples, the time period is sufficient for a Fast Fourier Transform ("FFT") analysis. In other embodiments, the time period is sufficient for other analyses. In other embodiments, the vibration measurement module 302 measures at a particular sampling rate sufficient for an intended frequency range.

In some embodiments, the vibration measurement module 302 includes various filters. For example, a channel of the measurement module 302 connected to a sensor 115, 167 may use a low pass filter on measured vibration information to filter out frequencies above a maximum frequency ("FMAX"). FMAX, in some embodiments, is 2 kHz, but may be higher or lower. In some embodiments, vibration information below about 2 kHz may capture vibrations for machine speeds around 60 Hz and below. Where a machine 124 is running at 3600 revolutions-per-minute ("rpm"), which corresponds to 60 Hz, energy from various bearings and other machine parts may vibrate at multiples of 60 Hz so that and may be below about 2 kHz. In other embodiments, an available FMAX may be 5 kHz.

In other embodiments, the vibration measurement module 302 includes high pass filters used to measure frequencies higher than those passed by the low pass filters. Often, vibration information at frequencies higher than about 2 kHz have magnitudes much less than vibration information below about 2 kHz and would be drowned out without a high pass filter. Typically, a sensor 115, 167 has one or more natural resonant frequencies so that rotation of bearings, rotor spin, etc. causes vibration energy at the natural resonant frequencies. Energy measured around the natural frequencies of a sensor 115, 167, in some embodiments, is called spike energy with units of gSE (spike energy acceleration). Just as striking a tuning fork causes the tuning fork to ring louder, rough bearings or other faults may cause more spike energy in terms of higher amplitudes at the natural resonant frequencies of the sensors 115, 167, and increased spike energy may be used to predict some impeding faults.

The failure detection apparatus 102 includes a frequency analysis module 304 configured to perform an operational frequency analysis of the vibration information. The operational frequency analysis, in some embodiments, is for vibrational information measured while the machine 124 is in an operational mode. The operational mode, in some embodiments, is a mode different than a setup mode, learning mode or other similar mode used to establish baseline information, such as vibration signatures. In other embodiments, the operational mode occurs when the machine 124 is operating to drive equipment as an intended purpose for the machine 124 or other period where baseline vibration signatures have been established or provided. In some embodiments, the operational mode occurs after a setup or learning mode. In other embodiments, the operational mode occurs once the machine 124 is started and is being operated by an end user and baseline data may be gathered during the operational mode.

The frequency analysis module 304 performs an operational frequency analysis during operation mode using vibration information measured by the vibration measurement module 302. In some embodiments, the operational frequency analysis is a Fourier analysis. A Fourier analysis is a method of converting data from a time domain to a frequency domain. A Fourier analysis is based on the idea that a waveform may deconstructed into discrete sinusoidal frequencies, each with a particular magnitude and phase shift. Often a Fourier analysis is displayed on a graph with frequencies on a horizontal axis and magnitude information on a vertical axis.

In some embodiments, the operational frequency analysis is a discrete Fourier transform ("DFT"), which uses discrete sampling to perform a Fourier transform. In other embodiments, the operational frequency analysis is an FFT, which is an algorithm to perform a DFT. An FFT is typically computationally more efficient than a DFT and produces results that are typically similar enough to a DFT to produce accurate results. In some embodiments, frequency analysis module 304 uses a sampling rate for the DFT and/or FFT based on machine speed. In some embodiments, the frequency analysis module 304 uses a sampling rate and produces results that are comparable to a vibration signature of the machine 124.

In some embodiments, the frequency analysis module 304 uses vibration information units of acceleration in gravity ("g's") or g-force where acceleration is based on the earth's gravitational pull. For example, 1 g is 9.8 meters per second squared (m/s$^2$). Using units of g's, in some embodiments, is a convenient measurement for frequency analysis. In other embodiments, the frequency analysis module 304 uses vibration information in terms of velocity. However, velocity measurements may be less useful at higher frequencies. In some embodiments, vibration information measured by the vibration measurement module 302 is integrated to velocity. In other embodiments, when signals are measured at frequencies over 1 kHz, the preferred units are g's.

In some embodiments, the frequency analysis module 304 performs an operational frequency analysis to produce vibration information in the form of acceleration magnitudes at various frequencies. As will be discussed in more detail below, the vibration information may be divided into various bands where the bands are based on machine speed. In some embodiments, common faults are referenced in terms of frequency orders, 1×, 2×, and so on, where 1× is one times running speed of the machine 124. For example, 60 Hz would correspond to 3600 revolutions-per-minute ("rpm"), 50 Hz would correspond to 3000 rpm, etc. Therefore, when 1× corresponds to 60 Hz, 2× would correspond to 120 Hz. Bearing faults and other types of faults are often expressed in multiples of machine speed (e.g. 0.5×, 1×, 2×, 3×, etc.) and certain faults are associated with a particular multiple of machine speed. Thus, a vibration signature for a particular machine speed, such as full speed, may include acceleration magnitudes at particular frequencies where a vibration signature for another machine speed for the same machine 124, such as half speed, may include different acceleration magnitudes at the same particular frequencies or even different acceleration magnitudes at different frequencies. Thus, beneficially the frequency analysis module 304 performs an operational frequency analysis, such as a FFT, on vibration data for a particular measured machine speed.

The failure detection apparatus 102 includes a comparison module 306 that compares results from the operational frequency analysis with a vibration signature for the machine 124 where the vibration signature for is for a machine speed that matches the machine speed of the measured vibration information. The vibration signature includes one of a plurality of vibration signatures for the machine 124 where each vibration signature is for a different machine speed. Having a different vibration signature for each machine speed is advantageous to have limits set for each machine speed rather than an overall vibration signature that might not pick up certain failure indications. For example, where the machine speed is half of full speed for the machine 124, the corresponding vibration signature may have lower magnitudes at various frequencies than the same frequencies at full speed. Thus, where the machine 124 is running at half speed, a magnitude of vibrations at a particular frequency may exceed the vibration signature for half speed by an amount indicative of a failure where the magnitude of the vibrations may not exceed the vibration signature of the machine 124 at full speed. Therefore, using vibration signatures for various machine speeds allows a closer match to actual running conditions than using a single vibration signature for a machine 124.

The failure detection apparatus 102 includes a fault identification module 308 configured to identify a potential failure mode based on a frequency range where the frequency analysis of the measured vibration information exceeds, by a threshold amount, the vibration signature of the plurality of vibration signatures that matches the machine speed. A vibration signature for a particular machine speed of the machine 124, in some embodiments, includes a frequency range where at particular frequencies the vibration signature has a corresponding magnitude for each of the particular frequencies and the magnitudes represent vibrations under normal operating conditions.

In some embodiments, for a particular machine speed, where a magnitude at particular frequency of the vibration information exceeds by a threshold amount a magnitude of vibrations at the same frequency in a corresponding vibration signature, the fault identification module 308 is configured to identify a potential failure mode corresponding to a particular part that is in or on the machine 124. For example, excessive vibrations at a particular frequency may indicate a start of a bearing failure where excessive vibrations at another frequency may indicate a beginning of a different type of failure, such as an inner race failure. At a different machine speed, the failures may be manifest at different frequencies.

In some embodiments, the fault identification module 308 uses known fault information for a known machine type and known machine part types to identify a fault or an indication of a developing fault. For example, where the machine 124 is a medium-sized electric motor, the operational frequency analysis may be split into around 8 bands where each band of frequencies may be associated with a particular type of fault. A Band 0 corresponds to bearing cage anomalies and may have a frequency range of 0.2× to 0.8× (e.g. 0.8× is 0.8 times the frequency of the machine speed), and may typically be about 15% of an overall level of vibration energy below about 2 kHz. A Band 1 corresponds to an unbalance with a frequency range of 0.8× to 1.2× and may typically be about 90% of the overall level of vibration energy below about 2 kHz. A Band 2 corresponds to misalignment or looseness with a frequency range of 1.2× to 2.2× and may typically be about 35% of the overall level of vibration energy below 2 kHz. Other bands correspond to other fault types and each machine type typically includes different bands with different frequency ranges and different amounts of vibration energy with respect to overall vibration energy.

In some embodiments, thresholds are set for each band, for each fault type, etc. based on expected energy in a particular frequency range. For example, for Band 0 above, a first threshold may be set to 0.42 millimeters per second (mm/s) and a second threshold may be set to 0.63 mm/s. For Band 1 a first threshold may be set to 2.52 mm/s and a second threshold may be set to 3.78 mm/s. In other embodiments, a vibration signature is based on measured vibration information at a particular machine speed and includes amplitude data for each band so that alarms are set as percentages of the measured data in the vibration signatures. For example, for one or more bands a first threshold may be set to 150% of the amplitude of the vibration signature for the machine speed that corresponds to the vibration information and a second threshold may be set to 200%. Other percentages may be chosen for a threshold to indicate a fault. Where the comparison module 306 determines that an operational frequency analysis includes vibration amplitude information in a particular band (e.g. Band 0) that is at or above 150% of the vibration amplitude information in the same Band 0 for a vibration signature matching the machine speed of the vibration information, the fault identification module 308 may then determine that there is a fault of the type associated with Band 0.

In some embodiments, the fault identification module 308 evaluates vibration energy in the form of spike energy ("gSE") of a sensor 115, 167. Typically, spike energy is quantified as an overall spike energy (gSE overall). Spike energy is typically above the FMAX of the low pass filter. Sensors 115, 167, associated high pass filters and spike energy algorithms, in some embodiments, filter out low frequency content and then measure high frequency signals up to about 40 kHz times FMAX. In some embodiments, a gSE algorithm is optimized so that natural frequencies (resonant frequencies) are near a center of a measurement range. Where a sensor 115, 167 and the vibration measurement module 302 measures up to 40 kHz and a high pass filter is set to 5 kHz, the mid-range of the gSE algorithm is about 22.5 kHz. Two different sensors 115, 167, even that are of the same type, typically have two different resonant frequencies.

In some embodiments, measured gSE energy is difficult to quantify in terms of a threshold so there are typically no spike energy tables. The comparison module 306 may then be set to identify an increase of gSE energy beyond a baseline in the corresponding vibration signature. The comparison module 306 may include a particular amount of increase of gSE energy, such as 200%, as a threshold to indicate to the fault identification module 308 that there is a particular fault. For example, certain early stage bearing faults may be associated with spike energy increase.

Some types of bearing faults are ball damage ("BSF"), inner race anomaly ("BPFI"), outer race anomaly ("BPFO") and cage anomaly ("FTF"). For rolling element bearing faults, each bearing fault has a specific frequency which can be calculated by way of a formula where each formula is dependent on machine speed. Thus, having vibration signatures for various machine speeds is beneficial to identify specific faults at the specific machine speeds.

In some embodiments, the fault identification module 308 uses fault progression information to identify faults that correspond to different stages of failure of a bearing or other part of a machine 124. For example, failure associated with bearings may follow five stages of failure. Stage 1 may include elevated spike energy, which may be far in advance of other indications of failure. In some embodiments, a bearing fault may be indicated by a spike energy measurement as low as 0.25 gSE overall. Stage 1 may be detected as early as 2 to 6 months ahead of bearing failure. Stage 2 may include excited bearing natural frequencies, which may be in a frequency band of around 1 kHz to 2 kHz. Consequently, when vibration elevates in this range, it can be an early indication of a bearing fault. However, depending on the machine, there may be other possible causes of vibration in this range, such as gear mesh, that should be discounted before determining that the vibration is being caused by a bearing fault.

Stage 3 includes increased vibration at discrete fault frequencies, such as BSF, BPFI, BPFO and FTF. Most of the fault indicators are above 1× machine speed but one fault indicator, FTF, is typically below 1×. Stage 4 includes vibrations at the harmonic of the bearing faults BSF, BPFI, BPFO and FTF. As failure progresses, energy at both the fundamental frequencies corresponding to BSF, BPFI, BPFO and FTF and their harmonics is present. Stage 5 is where failure is imminent and discrete frequencies will disappear and are typically replaced by a broad band of noise which may grow to include the frequency at 1×. The fault identification module 308, in some embodiments, identifies particular faults as well as a particular stage of failure. One of skill in the art will recognize other ways for the fault identification module 308 to utilize differences between an operational frequency analysis for measured vibration information at a machine speed and a vibration signature for the same machine speed to identify particular fault types within the machine 124.

The failure detection apparatus 102 includes an alert module 310 configured to transmit an alert that includes the identified potential failure mode or fault. In some embodiments, the alert module 310 transmits an alert to a person, for example, by way of an email, an instant message, a pop-up on an electronic display and the like. In other embodiments, the alert module 310 halts operation of the machine 124 and/or other equipment associated with the machine 124. For example, the alert module 310 may send a signal, message, etc. to a controller 113 of the machine 124 or a controller 134 of other equipment 125 to halt operation for certain faults. In another embodiment, in response to an alert from the alert module 310, a controller 113, 134 may control a drive 110 that is driving the machine 124 to change a machine speed of the machine 124.

Typically, the alert module 310 identifies a part on the machine 124 or other equipment where the fault was detected, such as a bearing, a bearing race, etc. at a particular location in the industrial operation 120. In some embodiments, the alert module 310 reports the type of fault identified by the fault identification module 308 along with information indicating where the fault is located. In other embodiments, the alert module 310 reports an amount of time anticipated before failure. For example, where the fault identification module 308 identifies increased spike energy at a bearing in the absence of other faults associated with the bearing, the alert module 310 reports the part where the vibrations occurred and an anticipated time period until an expected failure, such as 2 months. In some embodiments, the alert module 310 reports multiple faults or failure modes where the fault identification module 308 identifies multiple faults.

A failure mode, as used herein, includes failures and potential failures associated with faults identified by the fault identification module 308. A fault, in some embodiments, is where a comparison by the comparison module 306 identifies one or more frequencies where a magnitude from the vibration information exceeds a magnitude in the associated vibration signature. In some embodiments, faults help to identify failure modes. One of skill in the art will recognize other alerts and actions caused by alerts transmitted by the alert module 310.

Figure 4:
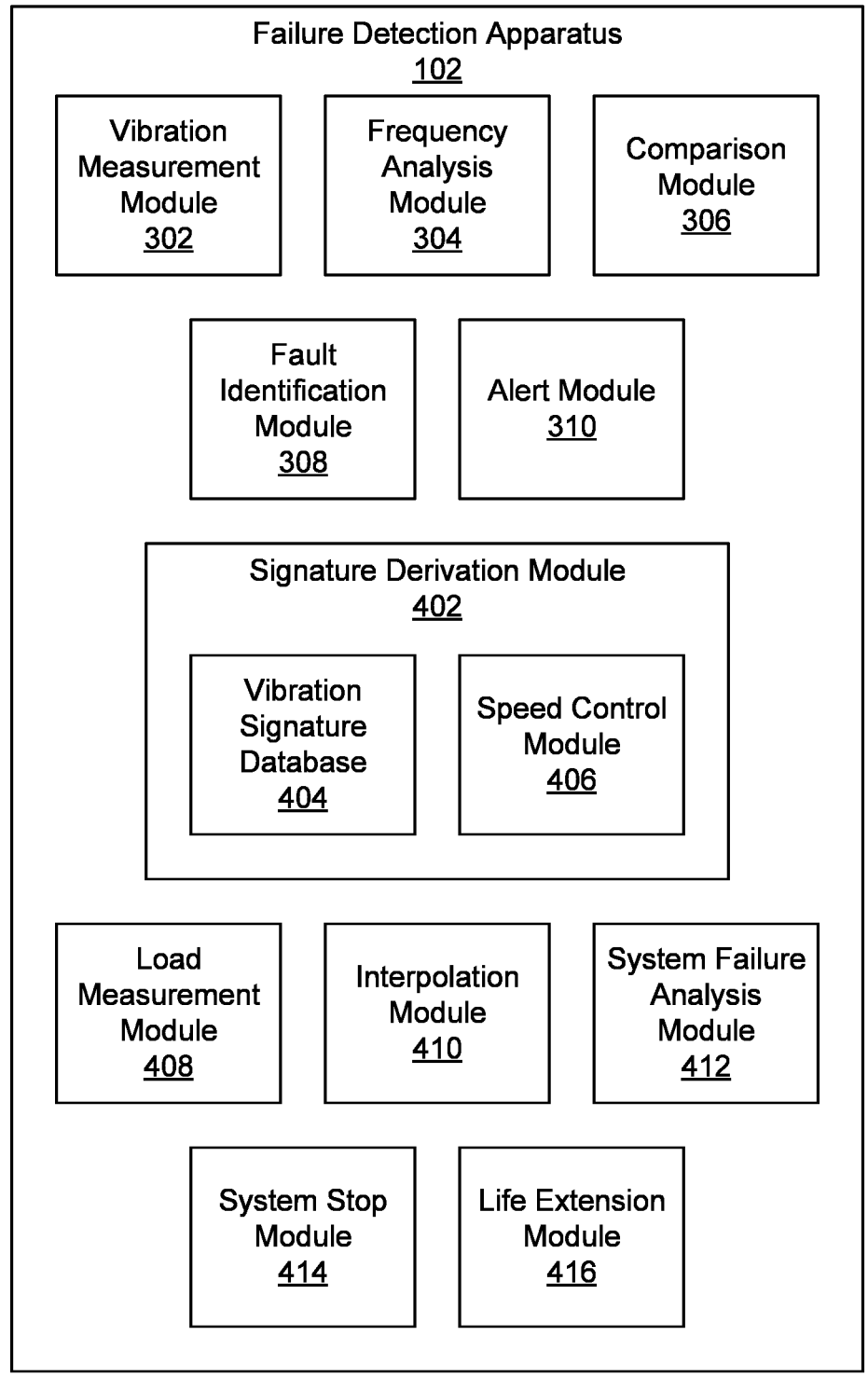
FIG. 4 is a schematic block diagram illustrating another embodiment of a failure detection apparatus according to an embodiment.

FIG. 4 is a schematic block diagram illustrating another embodiment 400 of a failure detection apparatus 102 according to an embodiment. In the embodiment 400, the failure detection apparatus 102 includes a vibration measurement module 302, a frequency analysis module 304, a comparison module 306, a fault identification module 308 and an alert module 310, which are substantially similar to those described above in relation to the embodiment 300 of the failure detection apparatus 102 of FIG. 3. The failure detection apparatus 102 also includes one or more of a signature derivation module 402 with a vibration signature database 404 and a speed control module 406, a load measurement module 408, an interpolation module 410, a system failure analysis module 412, a system stop module 414 and a life extension module 416, which are described below.

In some embodiments, the failure detection apparatus 102 includes a signature derivation module 402 configured to measure vibration information at the sensor for a plurality of machine speeds and perform, for each of the plurality of machine speeds, a frequency analysis of the vibration information to identify a vibration signature for each of the machine speeds. In some embodiments, the signature derivation module 402 stores the plurality of vibration signatures in a vibration signature database 404 for use by the comparison module 306 as described above. The vibration signature database 404, in some embodiments, is located in computer readable storage media accessible by the failure detection apparatus 102. For example, the vibration signature database 404 may be located in a computing device associated with the enterprise analytics 132. In other embodiments, the vibration signature database 404 is located in a storage system, such as a storage area network accessible to the failure detection apparatus 102.

The signature derivation module 402, in some embodiments, uses the vibration measurement module 302 and the frequency analysis module 304 to measure vibration information at a sensor 115, 167 and an associated machine speed for a machine 124 and then performs an operational frequency analysis of the vibration information to create a vibration signature. The signature derivation module 402 stores the derived vibration signature in the vibration signature database 404 for use by the comparison module 306 during operation. In other embodiments, the signature derivation module 402 uses other modules different than the vibration measurement module 302 and the frequency analysis module 304 to derive vibration signatures. In other embodiments, the signature derivation module 402 uses vibration information, associated machine speed and results from an operational frequency analysis performed during operation to derive a vibration signature.

In some embodiments, the signature derivation module 402 derives vibration signatures during a learning mode. The learning mode, for example, may be at initial startup during a normal operation mode when machine parts are expected to be free from failures and faults and the vibration signatures are at expected normal vibration levels. In some embodiments, the signature derivation module 402 includes a speed control module 406 that controls a machine 124 associated with a sensor 115, 167 to each of a plurality of machine speeds prior to measuring vibration information at the sensor 115, 167. In some examples, during a learning mode before normal operation, the speed control module 406 changes the machine speed so that the signature derivation module 402 can derive a vibration signature at each machine speed.

In some embodiments, the failure detection apparatus 102 includes a load measurement module 408 that records a loading condition for the machine 124 along with the machine speed when the vibration measurement module 302 measures the vibration information. Each of the plurality of vibration signatures is then associated with both a machine speed and a loading condition and the comparison module 306 compares results from the operational frequency analysis with a vibration signature that matches the machine speed along with the loading condition of the machine 124 during measurement of the vibration information.

In some embodiments, the signature derivation module 402 controls loading of the machine 124, for example during a learning mode, so that the vibration measurement module 302 measures the vibration information is for a plurality of machines speeds and loading conditions and each vibration signature is associated with a machine speed and a loading condition. Having both machine speed and loading conditions is advantageous because different loading conditions may also affect vibrations. Heavy loading may put more stress on a machine 124 or other equipment where the sensor 115, 167 is located, which may cause more vibrations or may affect amplitudes of vibrations.

In some embodiments, the failure detection apparatus 102 includes an interpolation module 410 configured to interpolate between vibration signatures close to the machine speed to derive an interpolated vibration signature for comparison with the results from the operational frequency analysis. In other embodiments, where the failure detection apparatus 102 includes a load measurement module 408, the interpolation module 410 is configured to interpolate between vibration signatures close the machine speed and loading conditions of the machine 124.

In some embodiments, the failure detection apparatus 102, for each of a plurality of sensors 115, 167, includes a system failure analysis module 412 that uses the vibration measurement module 302 to measure vibration information, uses the frequency analysis module 304 to perform an operational frequency analysis, and the comparison module 306 to compare the operational frequency analysis with a vibration signature. The system failure analysis module 412 identifies a potential failure mode based on a frequency range where the frequency analysis of the measured vibration information exceeds the vibration signature of the plurality of vibration signatures for each of the plurality of sensors 115, 167.

In some examples, the system failure analysis module 412 identifies a failure mode based on vibration information of a plurality of sensors 115, 167 and corresponding vibration signatures independent of machine speed. In other examples, the system failure analysis module 412 identifies a failure mode based on vibration information of a plurality of sensors 115, 167 and corresponding vibration signatures where the vibration information and vibration signatures have a matching of machine speed. In other embodiments, the system failure analysis module 412 identifies a failure mode based on vibration information of a plurality of sensors 115, 167 and corresponding vibration signatures where the vibration information and vibration signatures have a matching of machine speed and loading conditions.

In some embodiments, the failure detection apparatus 102 includes a system stop module 414 configured to stop one or more of machines 124, equipment 125, pumps 126, etc. of the industrial operation 120 in response to an alert transmitted by the alert module 310. For example, the fault identification module 308 may identify a fault that is indicative of a failure or an immanent failure and the system stop module 414 issues a stop command. In some embodiments, the stop command stops just the machine 124, equipment 125, pump 126, etc. identified by the fault identification module 308 to have the failed or failing part. In other embodiments, the stop command stops more than one of the machines 124, equipment 125, pumps 126, etc. of the industrial operation 120.

In some embodiments, the failure detection apparatus 102 includes a life extension module 416 configured to change the machine speed of the machine 124 to machine speed conducive to extending an operational life of equipment associated with the identified potential failure mode. For example, the identified potential failure mode may be exacerbated at high machine speed and running at a reduced speed may delay failure of the part monitored by the sensor 115, 167 where the vibration information was measured. In some embodiments, the life extension module 416 determines from the identified potential failure mode whether or not reducing machine speed is beneficial. In some embodiments, the life extension module 416 considers the cost of reduced machine speed with respect to failure of the part monitored by the sensor 115, 167 where the vibration information was measured. For example, reducing machine speed may be more expensive and/or risky than the risk of a shutdown based on the failed part, so the life extension module 416 may forgo a reduction in machine speed. In other examples, the cost or risk of reducing machine speed may be low compared to an unplanned shutdown if the machine 124 before a replacement part arrives.

Figure 5:
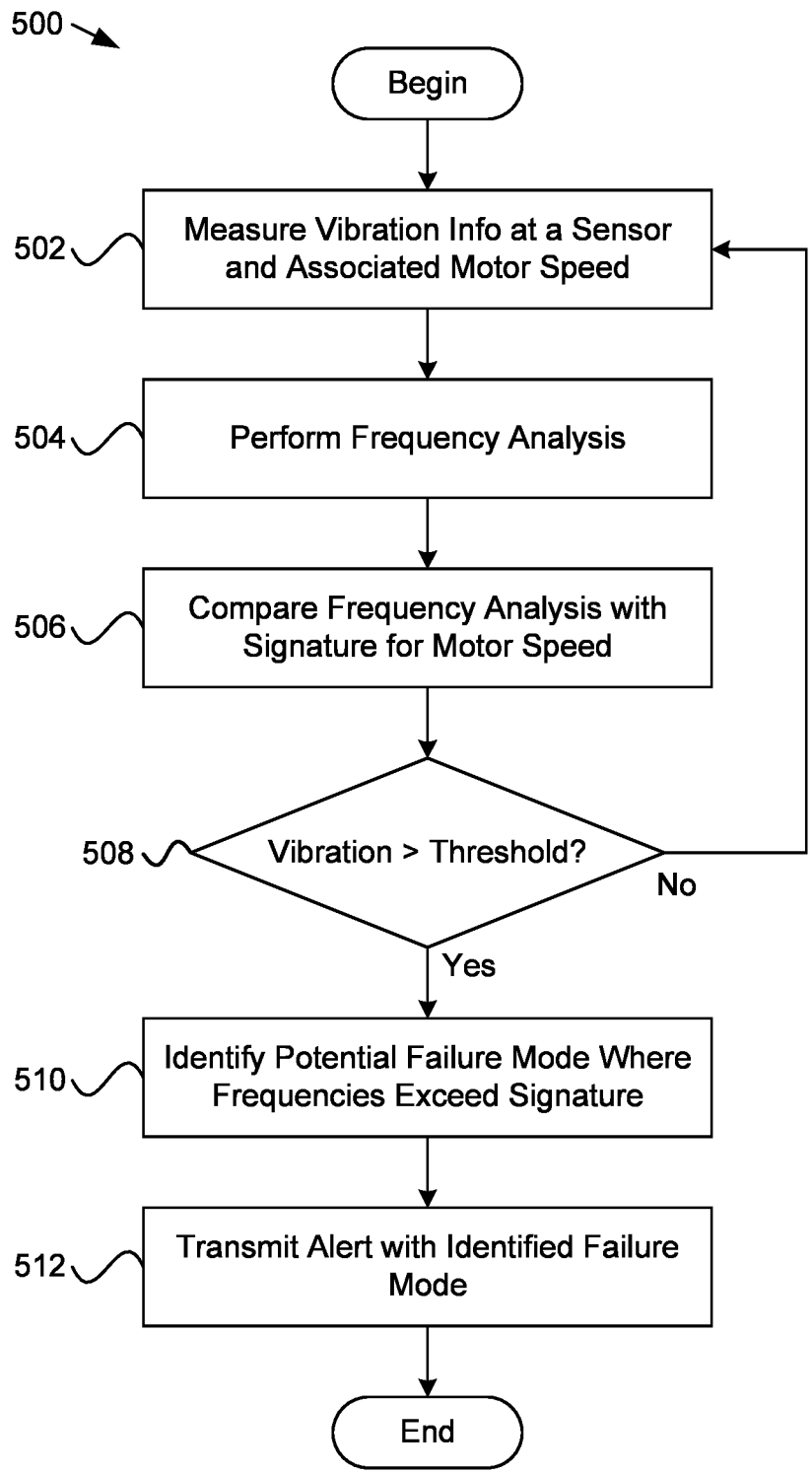
FIG. 5 is a schematic flowchart diagram illustrating one embodiment of a method for failure detection according to an embodiment.

FIG. 5 is a schematic flowchart diagram illustrating one embodiment of a method 500 for failure detection according to an embodiment. The method 500 begins and measures 502 vibration information at a sensor 115, 167 associated with a machine 124 and an associated machine speed. The machine is a rotating machine. The method 500 performs 504 an operational frequency analysis of the vibration information and compares 506 results from the operational frequency analysis with a vibration signature for the machine 124. The vibration signature is for a machine speed that matches the machine speed of the measured vibration information and the vibration signature is one of a plurality of vibration signatures for the machine 124, each for a different machine speed.

The method 500 determines 508 if the measured vibration information exceeds, by a threshold amount, the vibration signature of the plurality of vibration signatures that matches the machine speed. If the method 500 determines 508 that the measured vibration information does not exceed the vibration signature by a threshold amount, the method 500 returns and continues to measure 502 vibration information. If the method 500 determines 508 that the measured vibration information exceeds the vibration signature by a threshold amount, the method 500 identifies 510 a potential failure mode based on a frequency range where the frequency analysis of the measured vibration information exceeds, by a threshold amount, the vibration signature of the plurality of vibration signatures that matches the machine speed, and then transmits 512 an alert that includes the identified potential failure mode, and the method 500 ends. In various embodiments, the method 500 is implemented using one or more of the vibration measurement module 302, the frequency analysis module 304, the comparison module 306, the fault identification module 308 and the alert module 310.

Figure 6:
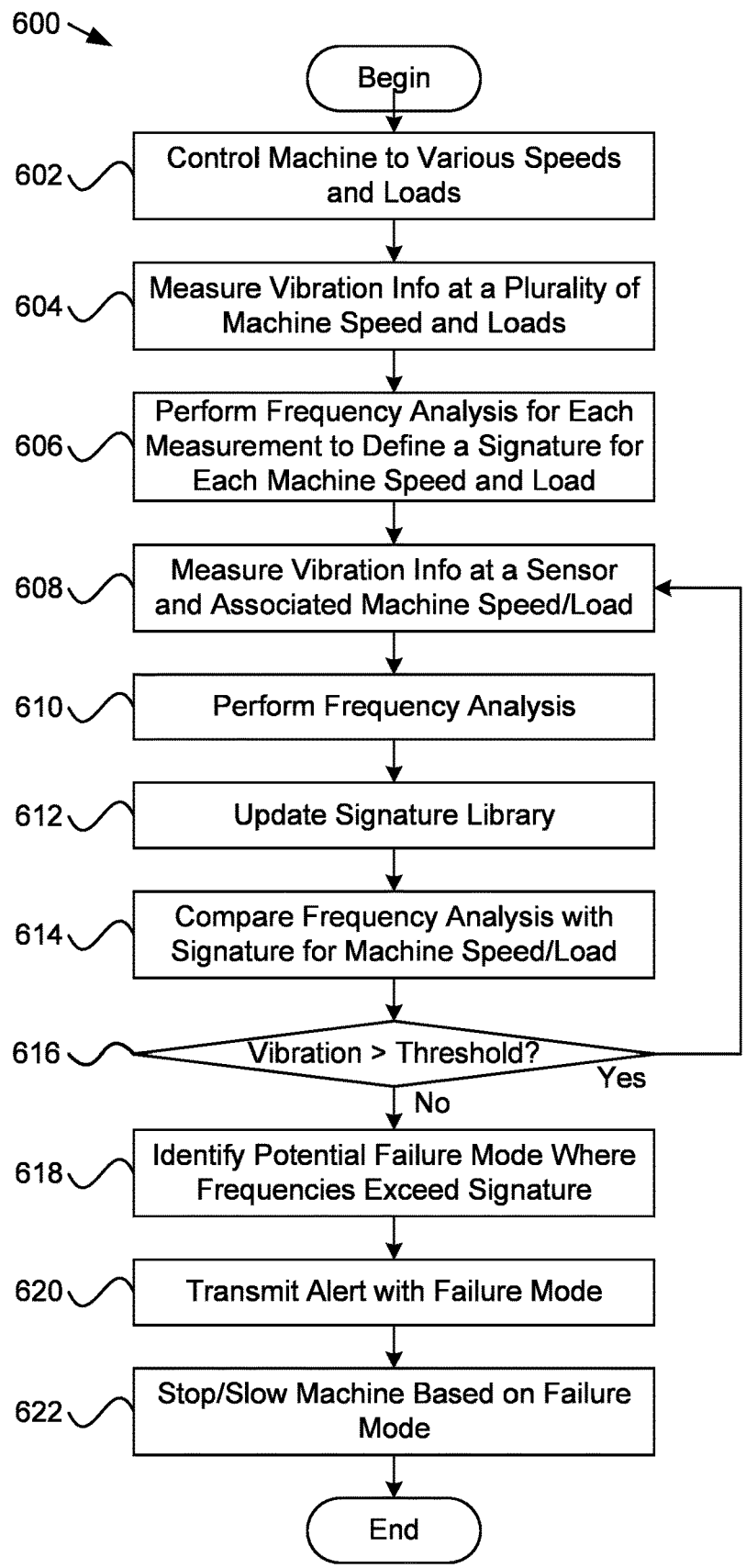
FIG. 6 is a schematic flowchart diagram illustrating another embodiment of a method for failure detection according to an embodiment.

FIG. 6 is a schematic flowchart diagram illustrating another embodiment of a method 600 for failure detection according to an embodiment. The method 600 begins and controls 602 a machine 124 to various machine speeds and loads, and measures 604 vibration information at a sensor 115, 167 associated with the machine 124 and an associated machine speed and load for each machine speed and load combination. The machine 124 is a rotating machine. The method 600 performs 606 an operational frequency analysis of the measured vibration information to define a vibration signature for each machine speed/load combination. In some embodiments, the method 600 performs steps 602-606 prior to normal operation. In other embodiments, the method 600 gathers vibration information during normal operation to add to a vibration signature database 404.

The method 600 measures 608 vibration information at a sensor 115, 167 associated with the machine 124 and an associated machine speed and loading condition. The method 600 performs 610 an operational frequency analysis of the vibration information. Optionally, the method 600 updates 612 the vibration signature database 404 with frequency analysis data to create or update vibration signatures. The method 600 compares 614 results from the operational frequency analysis with a vibration signature for the machine 124. The vibration signature is for a machine speed and loading condition that matches the machine speed and loading condition of the measured vibration information and the vibration signature is one of a plurality of vibration signatures for the machine 124, each for a different machine speed/loading condition combination.

The method 600 determines 616 if the measured vibration information exceeds, by a threshold amount, the vibration signature of the plurality of vibration signatures that matches the machine speed. If the method 600 determines 616 that the measured vibration information does not exceed the vibration signature by a threshold amount, the method 600 returns and continues to measure 608 vibration information. If the method 600 determines 616 that the measured vibration information exceeds the vibration signature by a threshold amount, the method 600 identifies 618 a potential failure mode based on a frequency range where the frequency analysis of the measured vibration information exceeds, by a threshold amount, the vibration signature of the plurality of vibration signatures that matches the machine speed, and transmits 620 an alert comprising the identified potential failure mode.

The method 600 stops 622 or slows 622 the machine 124 based on the identified failure mode in the alert message, and the method 600 ends. In various embodiments, the method 600 is implemented using one or more of the vibration measurement module 302, the frequency analysis module 304, the comparison module 306, the fault identification module 308, the alert module 310, the vibration signature database 404 and the speed control module 406, the load measurement module 408, the interpolation module 410, the system failure analysis module 412, the system stop module 414 and the life extension module 416.

Figure 7:
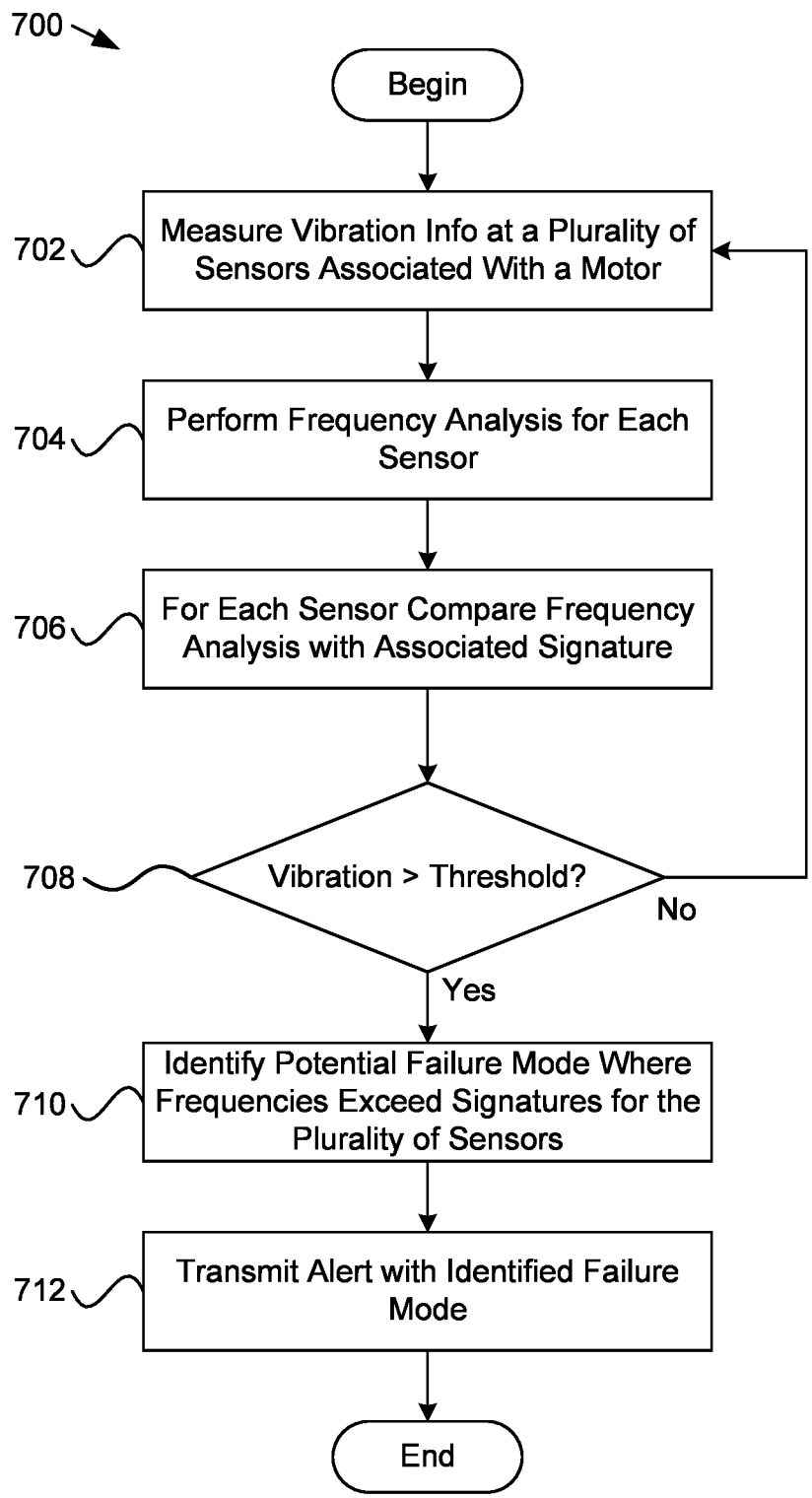
FIG. 7 is a schematic flowchart diagram illustrating one embodiment of a method for determining a failure location according to an embodiment.

FIG. 7 is a schematic flowchart diagram illustrating one embodiment of a method 700 for determining a failure location according to an embodiment. The method 700 begins and measures 702 vibration information at a plurality of sensors 115, 167 for equipment or a part associated with a machine 124. The equipment or part may include bearings, a shaft, etc. for the machine 124 itself, for a pump 126, for equipment 125, etc. of the industrial operation 120. The machine 124 is a rotating machine. The method 700, for each of the plurality of sensors 115, 167, performs 704 an operational frequency analysis of the vibration information. The method 700, for each sensor 115, 167, compares 706 results from each operational frequency analysis for a sensor 115, 167 with corresponding vibration signature for the sensor 115, 167.

For each sensor 115, 167, the method 700 determines 708 if the measured vibration information exceeds, by a threshold amount, the corresponding vibration signature. If the method 700 determines 708 that the measured vibration information for a sensor 115, 167 does not exceed the vibration signature by a threshold amount, the method 700 returns and measures 702 vibration information. If the method 700 determines 708 that the measured vibration information for a sensor 115, 167 exceeds the vibration signature by a threshold amount, the method 700 identifies 710 a potential failure mode based on a frequency range where the frequency analysis of the measured vibration information exceeds the corresponding vibration signature by the threshold amount.

Where there are multiple sensors 115, 167 with identified faults that have operational frequency analysis results with magnitudes at certain frequencies above vibration signature thresholds, the method 700 uses the identified faults to help determine where a potential failure mode is located. The method 700 transmits 712 an alert with the identified potential failure mode, and the method 700 ends. In various embodiments, the method 700 is implemented using one or more of the vibration measurement module 302, the frequency analysis module 304, the comparison module 306, the fault identification module 308, the alert module 310, the vibration signature database 404 and the speed control module 406, the load measurement module 408, the interpolation module 410, the system failure analysis module 412, the system stop module 414 and the life extension module 416.

Figure 8:
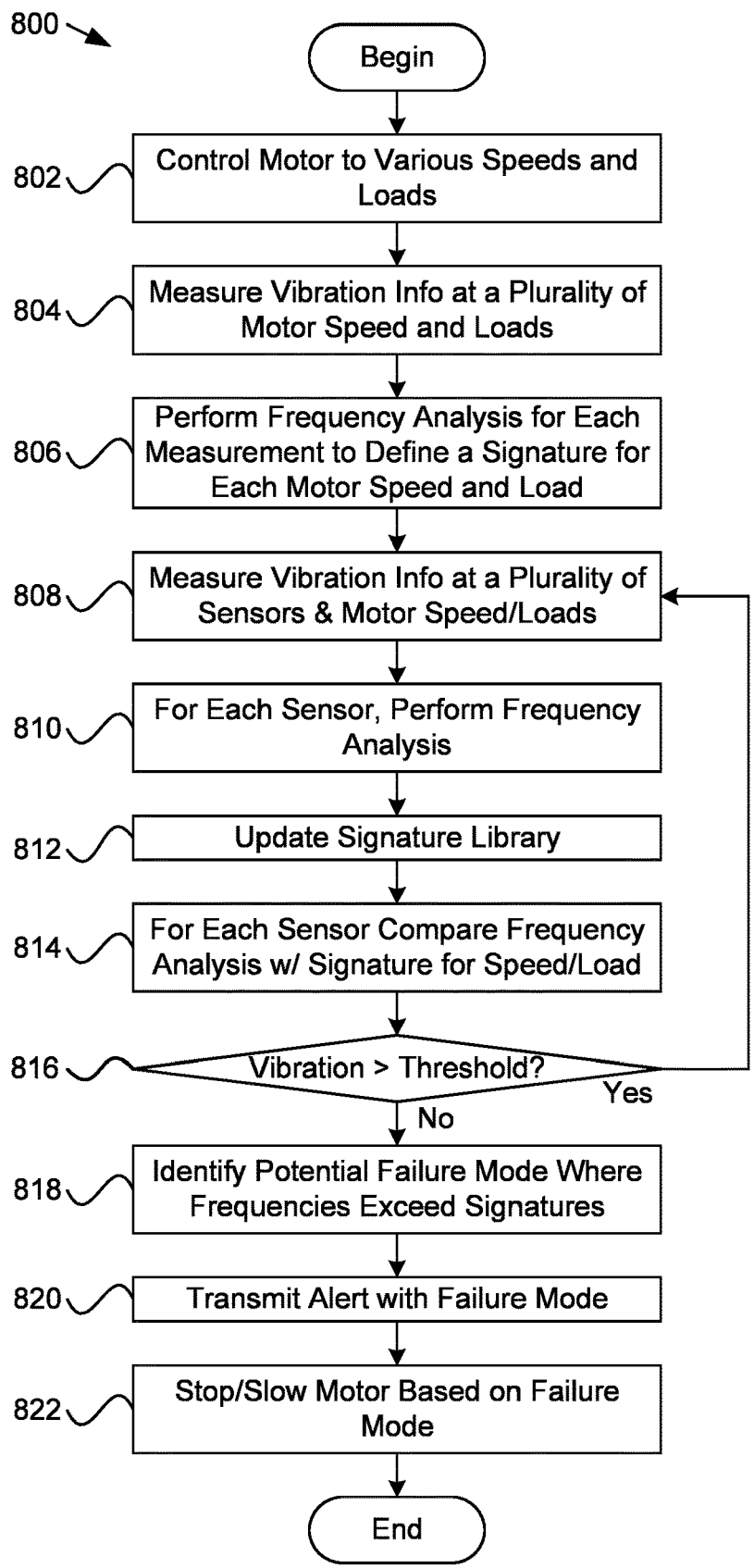
FIG. 8 is a schematic flowchart diagram illustrating another embodiment of a method for determining a failure location according to an embodiment.

FIG. 8 is a schematic flowchart diagram illustrating another embodiment of a method 800 for determining a failure location according to an embodiment. The method 800 begins and controls 802 a machine 124 to various machine speeds and loads and measures 804 vibration information at one or more sensors 115, 167 associated with the machine 124 and records an associated machine speed and load for each machine speed and load combination. The machine 124 is a rotating machine. The method 800 performs 806 an operational frequency analysis of the measured vibration information to define a vibration signature for each machine speed/load combination for the machine 124 and repeats steps 802-806 for sensors 115, 167 associated with other machines 124, equipment 125, pumps 126, etc. to derive vibration signatures for at least a portion of a plurality of sensors 115, 167 of the industrial operation 120. In some embodiments, the method 800 performs steps 802-806 prior to normal operation. In other embodiments, the method 800 gathers vibration information during normal operation to add to a vibration signature database 404.

The method 800 measures 808 vibration information at a plurality of sensors 115, 167 associated with one or more machines 124 of the industrial operation 120 and for each sensor 115, 167 an associated machine speed and loading condition. The method 800 performs 810, for each sensor 115, 167, an operational frequency analysis of the measured vibration information. Optionally, the method 800 updates 812 the vibration signature database 404 with frequency analysis data to create or update vibration signatures. The method 800, for each sensor 115, 167, compares 814 results from the operational frequency analysis with a vibration signature for the associated machine 124. The vibration signature is for a machine speed and/or loading condition that matches the machine speed and/or loading condition of the measured vibration information and the vibration signature is one of a plurality of vibration signatures for the machine 124, each for a different machine speed and/or loading condition combination.

For each sensor 115, 167, the method 800 determines 816 if the measured vibration information exceeds, by a threshold amount, the vibration signature of the plurality of corresponding vibration signatures. In some embodiments, the vibration information is for particular machine speeds and/or loading conditions. If the method 800 determines 816 that the measured vibration information does not exceed the vibration signature by a threshold amount, the method 800 returns and measures 808 vibration information. If the method 800 determines 816 that the measured vibration information exceeds the vibration signature by a threshold amount, the method 800 identifies 818 a potential failure mode based on a frequency range where the frequency analysis of the measured vibration information exceeds the corresponding vibration signature by the threshold amount.

Where there are multiple sensors 115, 167 with identified faults that have operational frequency analysis results with magnitudes at certain frequencies above vibration signature thresholds, the method 800 uses the identified fault data to help identify where a potential failure mode is located. The method 800 transmits 820 an alert with the identified potential failure mode. The method 800, in some embodiments, stops 822 or slows 822 the machine 124 based on the identified failure mode in the alert message, and the method 800 ends. In various embodiments, the method 800 is implemented using one or more of the vibration measurement module 302, the frequency analysis module 304, the comparison module 306, the fault identification module 308, the alert module 310, the vibration signature database 404 and the speed control module 406, the load measurement module 408, the interpolation module 410, the system failure analysis module 412, the system stop module 414 and the life extension module 416.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    measuring vibration information at a sensor associated with a machine and an associated machine speed, wherein the machine comprises a rotating machine;
    performing an operational frequency analysis of the vibration information;
    receiving a plurality of individual vibration signatures which each correspond to a different machine speed of the machine;
    selecting vibration signatures from the plurality of individual vibration signatures based on the machine speed of the measured vibration information, wherein the selected vibration signatures correspond to machine speeds that are close to the machine speed of the measured vibration information;
    interpolating between the selected vibration signatures close to the machine speed to derive an interpolated vibration signature for comparison with results from the operational frequency analysis;
    comparing the results from the operational frequency analysis with the interpolated vibration signature;
    identifying a potential failure mode based on a frequency range where the frequency analysis of the measured vibration information exceeds, by a threshold amount, the interpolated vibration signature; and
    transmitting an alert comprising the identified potential failure mode.

2. The method of claim 1, wherein the plurality of vibration signatures are derived by:
    measuring vibration information at the sensor for a plurality of machine speeds; and
    performing, for each of the plurality of machine speeds, a frequency analysis of the vibration information to identify a vibration signature for each of the machine speeds.

3. The method of claim 2, further comprising controlling the machine to each of the plurality of machine speeds prior to measuring the vibration information.

4. The method of claim 3, further comprising controlling loading of the machine, wherein measuring the vibration information is for a plurality of machines speeds and loading conditions and each vibration signature is associated with a machine speed and a loading condition.

5. The method of claim 2, wherein each vibration signature for the plurality of machine speeds is determined during a normal machine operation mode when the vibration signatures are at expected normal vibration levels.

6. The method of claim 1, further comprising recording a loading condition for the machine along with the machine speed when measuring the vibration information, wherein each of the plurality of vibration signatures is associated with a machine speed and a loading condition and wherein comparing results from the operational frequency analysis with a vibration signature comprises comparing the results from the operational frequency analysis with a vibration signature that matches the machine speed and the loading condition of the machine during measurement of the vibration information.

7. The method of claim 1, further comprising a plurality of sensors and wherein measuring vibration information, performing an operational frequency analysis, and comparing the results from the operational frequency analysis with a vibration signature are performed for each of the plurality of sensors and wherein identifying a potential failure mode comprises identifying a potential failure mode based on a frequency range where the frequency analysis of the measured vibration information exceeds the vibration signature of the plurality of vibration signatures for each of the plurality of sensors.

8. The method of claim 7, wherein the plurality of sensors are installed on a plurality of pieces of equipment and/or machines.

9. The method of claim 1, wherein the sensor is one of a vibration sensor and an acoustic sensor.

10. The method of claim 1, wherein identifying a potential failure mode comprises one of predicting a failure, identifying an initial stage of a failure, and identifying a failure that has occurred.

11. The method of claim 1, further comprising, in response to the alert:
alerting a person of the identified potential failure mode;
halting operation of the machine and/or equipment associated with the machine; and
changing the machine speed of the machine to machine speed conducive to extending an operational life of equipment associated with the identified potential failure mode.

12. A method comprising:
measuring vibration information at a plurality of sensors associated with equipment associated with a machine and an associated machine speed, wherein the machine comprises a rotating machine;
for each of the plurality of sensors, performing an operational frequency analysis of the vibration information;
receiving a plurality of corresponding individual vibration signatures for each of the plurality of sensors, each of the plurality of corresponding individual vibration signatures for a sensor corresponding to a different machine speed of the machine;
interpolating between the corresponding individual vibration signatures close to the associated machine speed for each of the plurality of sensors to derive an interpolated vibration signature for each of the plurality of sensors for comparison with results from the operational frequency analysis;
comparing the results from each operational frequency analysis for the plurality of sensors with the corresponding interpolated vibration signature for each of the plurality of sensors;
identifying a potential failure mode in response to the results from one or more of the operational frequency analyses of the plurality of sensors exceeding, by a threshold amount, the corresponding individual vibration signatures; and
transmitting an alert comprising the identified potential failure mode.

13. The method of claim 12, wherein identifying a potential failure mode in response to one or more operational frequency analyses of the plurality of sensors exceeding the corresponding vibration signatures comprises a plurality operational frequency analyses for a plurality of sensors each exceeding the corresponding vibration signature and identifying the potential failure mode from how much each of the plurality of operational frequency analyses exceeded the corresponding vibration signatures.

14. The method of claim 12, wherein:
one or more sensors of the plurality of sensors are associated with a machine and further comprising measuring a machine speed associated with a sensor of the plurality of sensors when measuring vibration information for the sensor of the plurality of sensors; and
for each sensor associated with a machine of the plurality of sensors, further comprising comparing results from the operational frequency analysis for a sensor with corresponding vibration signature for the sensor, wherein the corresponding vibration signature is for a machine speed that matches the machine speed of the machine associated with the sensor measured when measuring the vibration information for the sensor.

15. The method of claim 14, wherein for each sensor associated with a machine, further comprising:
measuring vibration information at the sensor for a plurality of machine speeds; and
performing, for each of the plurality of machine speeds, a frequency analysis of the vibration information to identify a vibration signature for each of the machine speeds.

16. A component comprising:
a processor; and
a memory that stores program code executable by the processor to:
measure vibration information at a sensor associated with a machine and an associated machine speed, wherein the machine comprises a rotating machine;
perform an operational frequency analysis of the vibration information;
receive a plurality of individual vibration signatures which each correspond to a different machine speed of the machine;
select vibration signatures from the plurality of individual vibration signatures based on the machine speed of the measured vibration information, wherein the selected vibration signatures correspond to machine speeds that are close to the machine speed of the measured vibration information;
interpolate between the selected vibration signatures close to the machine speed to derive an interpolated vibration signature for comparison with results from the operational frequency analysis;

compare the results from the operational frequency analysis with the interpolated vibration signature;

identify a potential failure mode based on a frequency range where the frequency analysis of the measured vibration information exceeds, by a threshold amount, the interpolated vibration signature; and transmit an alert comprising the identified potential failure mode.

17. The component of claim 16, wherein the plurality of vibration signatures are derived by program code executable by the processor to:

measure vibration information at the sensor for a plurality of machine speeds; and perform, for each of the plurality of machine speeds, a frequency analysis of the vibration information to identify a vibration signature for each of the machine speeds.

18. The component of claim 16, one or more of:

further comprising controlling the machine to each of a plurality of machine speeds prior to measuring the vibration information; and wherein each vibration signature for the plurality of machine speeds is determined during a normal machine operation mode when the vibration signatures are below expected normal vibration levels.

19. The component of claim 16, further comprising program code executable by the processor to record a loading condition for the machine along with the machine speed when measuring the vibration information, wherein each of the plurality of vibration signatures is associated with a machine speed and a loading condition and wherein comparing the results from the operational frequency analysis comprises comparing the results from the operational frequency analysis with the interpolated vibration signature and the loading condition of the machine during measurement of the vibration information.

* * * * *